Patented Mar. 9, 1943

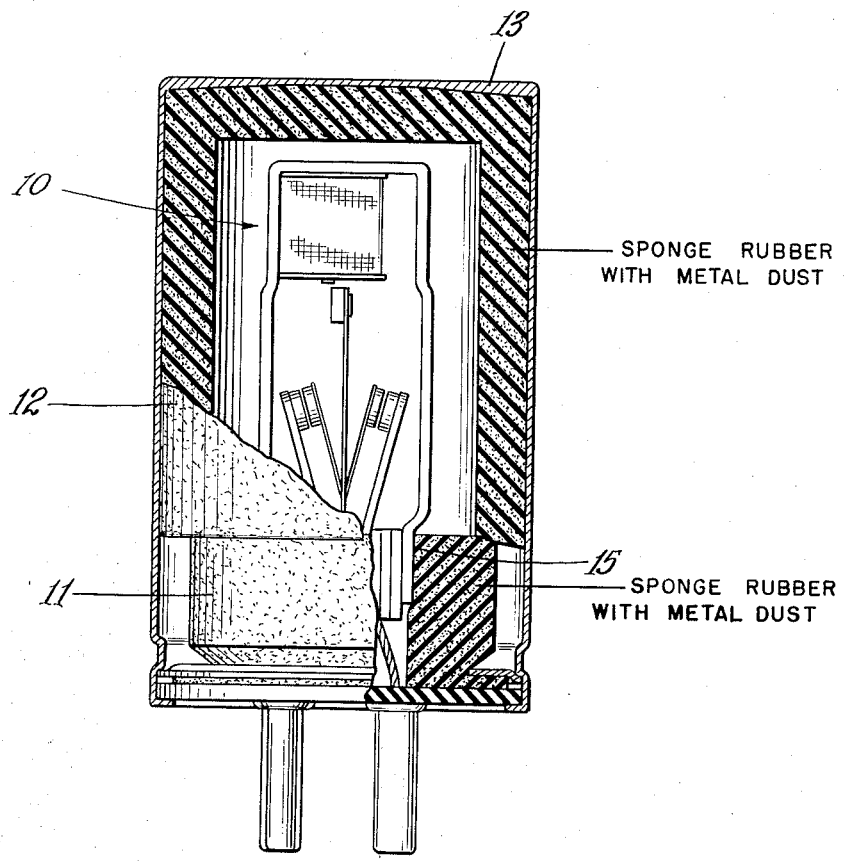

2,313,379

UNITED STATES PATENT OFFICE 2,313,379

MOUNTING MEANS FOR ELECTRICALLY OPERATED UNITS

Raymond E. Wood, Downers Grove, Ill., assignor, by mesne assignments, to Van Cleef Bros., Chicago, Ill., a firm consisting of Noah Van Cleef, Felix Van Cleef, and Paul Van Cleef Application December 30, 1940, Serial No. 372,251

8 Claims. (Cl. 200—168)

This invention relates to mountings for electrically operated units, such, for example, as vibrator type converters for changing direct current to alternating current.

Sponge rubber is being used to a large extent in connection with damping vibration and noise. Thus, in electric vibrators or converters, flexible sponge rubber mountings are provided for deadening the noise of operation. This is illustrated in United States Patents Nos. 2,140,792 and 2,140,807. In a device of this character, considerable heat is developed and must be dissipated in order to promote efficiency. Due to the high heat insulating value of sponge rubber, this dissipation of heat is greatly impeded and results in objectionably high temperatures.

The sponge rubber, under such conditions, deteriorates rapidly, decomposes and shrinks to a mass having little of the properties of the original rubber. In such a case, apart from the loss of sound insulation, the mechanical supporting function of the rubber is so seriously impaired that dislocation of and serious damage to the apparatus may result.

By virtue of the invention hereinafter described, these objectionable characteristics of previously proposed sponge rubber mountings are eliminated. The heat conductivity of the sponge rubber is improved to a substantial degree. Furthermore, it has been found that the improved sponge rubber tends to shrink and become firm substantially at the supporting face only where the heat is generated. Elsewhere, the rubber retains its flexibility. This gripping of the apparatus is desirable since the transmission of heat to the rubber from the heat source is facilitated.

The invention itself is simple and consists in introducing powdered metal having high heat conductivity throughout the sponge rubber. While small amounts of aluminum have been introduced into rubber for coloring purposes, the amount of metal has been too small for any substantial effects on heat conductivity. Thus, for coloring purposes, a proportion of 1% by weight of metal to rubber has been used. However, this invention contemplates increasing the proportion of powdered metal far beyond the requirements for coloring. Thus, proportions of about 5% or 10% on up to 40% or 50% or even more may be used. A 20% proportion by weight of powdered aluminum has been used successfully by me. When the powdered aluminum or other metal is 5% by weight of the sponge rubber, or more, the metal is in such amount that the particles or grains thereof are in contact with one another and hence serve effectively and efficiently to dissipate or transfer heat.

These proportions relate to aluminum. Other metals having high heat conductivity may have their proportions correspondingly varied in accordance with their specific gravity. There is no definite upper limit for the powdered metal filler. Increasing the metal content results in increased heat conductivity, denser material and thus reduced sound insulating efficiency. Furthermore, the increased metal content results in greater cost. Hence the upper limit of metal to rubber proportion may be varied widely as occasion demands.

The metal is preferably in the form of a fine dust and is thoroughly mixed with the liquid rubber to disperse the metal prior to conventional curing or processing of the rubber. The technique of handling the sponge rubber remains substantially the same so that it is unnecessary to describe the manufacture thereof.

The metal is preferably aluminum since it does not harm, or react with the sponge or cellular rubber in any way and has desired heat conducting properties, as well as being cheap and readily available. Other finely divided or powdered metals having high heat conductivity may be used instead of aluminum provided, however, that their presence in the rubber may be tolerated. Powdered zinc is one example.

Referring to the drawing, the figure shows a sectional elevation of an electric vibrator 10 supported by flexible mounting members 11 and 12 of the new sponge rubber composition, and enclosed in a metal can or container 13. Inasmuch as the mechanical details of the vibrator are well known and not involved here, no further description will be given. It need only be pointed out that a vibrator generates noise to an objectionable degree and, like all electrically-operated devices, has heat generated therein which must be dissipated. Member 11 is merely a base into which the vibrator bottom fits while 12 is a cylindrical or cup-shaped member which surrounds the frame and operating parts of the vibrator and is in direct contact with the inner face of the can 13. The mounting member 11 is located beneath the mounting member 12 and is ring-shaped. It surrounds the base of the frame for the operating parts of the vibrator and is in heat exchange relation with the can by way of a metal ring in the lower end of the can.

As a rule, the portion 15 of member 11 immediately adjacent the vibrator bottom part has the most intimate contact with the vibrator and is heated the most. This portion tends to become firmer and to shrink around the vibrator. Thus, the vibrator is gripped more tightly than before and transfer of heat to the can is promoted. The bulk of the rubber remains substantially as before. The temperature of the vibrator with ordinary sponge rubber as distinguished from the sponge rubber of my invention varies substantially, the latter rubber conducting heat away more rapidly and leaving the vibrator cooler and hence more efficient. Thus, in vibrators for automobile radios, a comparative test showed a difference of about 30° F. with vibrator temperatures of the order of 250° F.

This invention may be applied to either natural or synthetic sponge rubber, and the product may be used where a resilient mounting material having substantial heat conductivity is desired.

By reason of the dispersion of metal particles throughout the rubber, some electrostatic shielding effects are obtained. This is important in electrical devices and particularly vibrators. Due to the generation of sharp potential peaks, undesirable radiation of high frequency impulses occurs. By virtue of the relatively thick metal bearing rubber wall, substantial shielding effects may be obtained.

It is also possible to use particles of magnetizable metal such as nickel and disperse the same throughout the rubber. In fact, some alloys of aluminum, nickel and cobalt have particularly powerful magnetic retentivity and may be used if desired. Magnetic shielding could thus be obtained while using the material, if soft, for sound insulation or other purposes where heat conductivity is also a factor.

Increasing the metal content of the improved mounting material naturally reduces the electrical resistance as compared to pure rubber. It is thus possible to load the rubber with so much metal that the resulting material may be considered as a high resistance conductor. This property may be useful in certain instances. Thus, for example, in the vibrator it is desirable to shunt the terminals by a high resistance to act as a filter. This is shown in Patent 2,096,962. Instead of using a definite resistance element, the metal content of the sponge rubber may be increased to a point where the rubber material gripping the vibrator parts acts as a high resistance shunt.

The invention is not to be understood as restricted to the details set forth since these may be modified within the scope of the appended claims without departing from the spirit and scope of the invention.

What is claimed is:

1. In combination, an electric vibrator and a heat conducting soundproof enclosure consisting of cellular rubber having a metal in finely divided form dispersed therethrough with the metal to rubber ratio by weight being above 5%.

2. The combination of claim 1 wherein said metal is aluminum and the ratio is between 10% and 50%.

3. In combination, a device adapted to generate noise and heat during operation and heat conducting material for supporting said device, said material comprising sponge rubber having finely divided aluminum dispersed throughout said rubber and being present in a quantity of between 5% and 50% by weight of rubber.

4. In combination with an electrical operating unit, a member arranged as a mounting medium for the unit and formed of sponge rubber and a filling or admixture of powdered metal having comparatively high heat conductivity and distributed substantially uniformly throughout the rubber and in such amount that the particles or grains are in contact with one another.

5. In combination with an electrical, radio receiving set operating unit and a casing in spaced relation around the unit, a member between, and in contacting relation with, the casing and the unit and formed of sponge rubber and a filling or admixture of pulverulent material having comparatively high heat conductivity, distributed substantially uniformly throughout the rubber and in such amount that the particles or grains are in contact with one another.

6. In combination with an electrical, radio receiving set operating unit and a casing in spaced relation around the unit, a ring shaped mounting member extending around a part of the unit and in abutting relation with the casing and formed of sponge rubber and a filling or admixture of powdered aluminum and distributed substantially uniformly throughout the sponge rubber and in such amount that the particles or grains are in contact with one another.

7. In combination with an electrically operated unit and a metallic casing in spaced relation around the unit, a mounting member surrounding a portion of the unit and in abutment with the casing and formed of sponge rubber and a filling or admixture of powdered metal having comparatively high heat conductivity and distributed substantially uniformly throughout the rubber and in such amount that the particles or grains are in contact with one another.

8. In combination with a radio interrupter type converter including a frame and a metallic shell-like casing in spaced relation around the frame, a mounting member extending between and in contact with the casing and frame and formed of sponge rubber and a filling or admixture of aluminum powder dispersed substantially uniformly throughout the rubber and in sufficient amount so that the particles or grains thereof are in contact with one another and serve to dissipate or transfer heat from the unit to the casing.

RAYMOND E. WOOD.